United States Patent
Cohen

(10) Patent No.: US 7,203,674 B2
(45) Date of Patent: Apr. 10, 2007

(54) METHOD AND SYSTEM TO CONNECT AND MATCH USERS IN AN ELECTRONIC DATING SERVICE

(76) Inventor: Morgan Cohen, 707 Continental Cir., Apt 1137, Mountain View, CA (US) 94040-3381

( * ) Notice: Subject to any disclaimer, the term of this patent is extended or adjusted under 35 U.S.C. 154(b) by 562 days.

(21) Appl. No.: 10/078,315

(22) Filed: Feb. 15, 2002

(65) Prior Publication Data

US 2003/0191673 A1  Oct. 9, 2003

(51) Int. Cl.
G06F 17/30 (2006.01)
G06F 7/00 (2006.01)
G06F 15/16 (2006.01)

(52) U.S. Cl. .................... 707/3; 707/10; 707/102; 707/5; 709/206; 709/209

(58) Field of Classification Search ............... 707/10, 707/102; 705/5; 709/206, 204
See application file for complete search history.

(56) References Cited

U.S. PATENT DOCUMENTS

| | | | |
|---|---|---|---|
| 5,796,395 A * | 8/1998 | de Hond | 715/751 |
| 5,884,272 A | 3/1999 | Walker et al. | |
| 5,920,845 A * | 7/1999 | Risemberg | 705/1 |
| 5,963,625 A * | 10/1999 | Kawecki et al. | 379/127.01 |
| 5,963,951 A * | 10/1999 | Collins | 707/102 |
| 6,020,810 A * | 2/2000 | Har-Even | 340/328 |
| 6,029,195 A | 2/2000 | Herz | |
| 6,061,681 A | 5/2000 | Collins | |
| 6,223,165 B1 | 4/2001 | Lauffer | |
| 6,272,467 B1 | 8/2001 | Durand et al. | |
| 6,480,885 B1 | 11/2002 | Olivier | |
| 6,549,768 B1 * | 4/2003 | Fraccaroli | 455/456.3 |
| 7,092,952 B1 * | 8/2006 | Wilens | 707/100 |
| 2002/0071426 A1 * | 6/2002 | Karamchedu et al. | 370/352 |
| 2002/0090911 A1 * | 7/2002 | Evans et al. | 455/41 |
| 2002/0103792 A1 * | 8/2002 | Blank et al. | 707/3 |
| 2002/0106066 A1 * | 8/2002 | Swanson et al. | 379/196 |
| 2002/0116458 A1 * | 8/2002 | Bricklin et al. | 709/204 |
| 2002/0178225 A1 * | 11/2002 | Madenberg et al. | 709/206 |
| 2003/0153343 A1 * | 8/2003 | Crockett et al. | 455/519 |
| 2005/0209914 A1 * | 9/2005 | Nguyen | 705/14 |

OTHER PUBLICATIONS

PCT International Search Report, PCT/US03/04526, Feb. 13, 2003.

* cited by examiner

*Primary Examiner*—Jeffrey Gaffin
*Assistant Examiner*—Cindy Nguyen
(74) *Attorney, Agent, or Firm*—Blakely, Sokoloff, Taylor & Zafman

(57) ABSTRACT

Described herein is a method and system for connecting and matching users in an electronic dating service. In one embodiment of the invention, subscribers, or users, of the dating service are connected for a brief duration of time. During that time the users have a date, or more specifically, a real-time conversation. After the real-time conversation, the users are disconnected from each other and separately asked if they enjoyed the date, or in other words if they felt a mutual attraction, and if they would like to have further contact with each other. If both users respond affirmatively then they are allowed further contact with each other.

29 Claims, 13 Drawing Sheets

My Profile

Telephone Settings

Select Active
Number

- ● Cell      (650) 555 - 1234
- ○ Home   (650) 555 - 1234
- ○ Work    (650) 555 - 1234  Ext 555
- ○ VoIP     sip:devorah@californiawildrose.com Same phone line
for voice calls
and Internet
access

☐ ☒ ☐

Time Zone: PST (UST-8) ▸

● I accept unlimited length dates from my two-way matches at the following times:

Monday thru Friday, between: 09 : 00 am ▸ and 08 : 00 pm ▸

Saturday thru Sunday, between: 06 : 00 am ▸ and 10 : 00 pm ▸

○ I do not accept unlimited length dates from my two-way matches

METHOD AND SYSTEM TO CONNECT AND MATCH USERS IN AN ELECTRONIC DATING SERVICE

FIELD OF THE INVENTION

This invention relates to techniques for an electronic dating service, more particularly, to a method and system for connecting and matching users.

BACKGROUND OF THE INVENTION

Dating and matchmaking have been around for a long time. However, today's fast-paced lifestyles have caused single people to come under increasing time pressures at work, school, and play. Such lifestyles leave little time left for conventional dating. Furthermore, single people are more mobile than ever, which makes it more difficult to meet people for dating. Also, individuals have higher expectations of meeting the 'right' person: someone with whom they are compatible and with whom they have 'chemistry'. Finally, workplace romance is on the decline due to growing sensitivity about sexual harassment. Consequently, many singles are enlisting the use of electronic dating services, hoping to find a more convenient and effective dating experience. Currently, there are two broad classes of electronic dating services:

Web based dating; and
telephone based dating (which may also feature a limited Web user interface).

Web Based Dating

In Web based, or online, dating services, an individual first becomes a subscriber by completing a detailed profile, providing various details about themselves such as age, geographic location, physical characteristics, and likes and dislikes. The individual then searches for others by entering similar criteria, such as age range, geographic location, and desired physical characteristics. After searching, the individual can review the matching users' profiles, which may contain a photograph. The individual then decides which of the matching users they would like to pursue, and sends them an e-mail in the hope of receiving a response. Users then get to know one another by exchanging e-mails.

Web based dating services, however, suffer from major inherent drawbacks. First, the sign-up process is cumbersome because users must complete lengthy questionnaires and compose essay-type questions. This results in a high rate of abandonment during the sign-up process.

Second, it is difficult for an individual to assess other users and get a sense of what they are really like based on simply viewing their photograph and reading the textual data in their profile.

Third, email, or electronic text, is not an effective means of communication for getting to know someone for the first time, and learning what they and their personality is really like. It is too impersonal. It does not carry a wealth of human information like tone. The users must gauge 'chemistry' purely from an exchange of textual data, thus leading to uncertainty whether mutual attraction exists between two users. As a result, many shy people never end up making the first move for fear that the other person may not share a mutual interest. For others who misjudge mutual attraction, it can result in awkward or embarrassing situations, such as trying to end an unwanted conversation.

Fourth, there is a time lag in the back and forth flow of information between the two parties. Trying to get to know someone through exchanging e-mails is usually cumbersome and tedious. Some Web services try to make the process more interactive by allowing the exchange of instant text messages with those users who happen to be present on the system. However, instant text messages still suffer from the uncertainty and stodginess of purely textual communication Fifth, some Web based services attempt to match users solely by comparing attributes of their profiles, such as age, geographic location, height, and various likes and dislikes. They assign weightings to each matching factor, and then compute an overall score representing the degree of matching. One problem with this method of matching is that the weights assigned to each matching factor are arbitrary. For some individuals, it would be more important that their match was tall than if they had dark hair, but this is not taken into account. Fundamentally, this purely scientific approach to matchmaking does not work in practice. It is well known that just because two individuals appear to be a good match based on attributes in their profiles, it does not mean that if they were to talk or meet, that they there would be 'chemistry' between them.

Finally, Web based dating services result in a very uneven level of activity across users. Those individuals who have profiles that are perceived as unattractive receive little or no interest from other users. This will result in them becoming dissatisfied and desisting from using the service. Conversely, those with profiles perceived as attractive receive an abundance of interest from other users, usually becoming overloaded with e-mails (for example, receiving hundreds of e-mails per day). This results in both the user who is perceived as attractive becoming dissatisfied with the service, because they are overwhelmed and can not make a rational decision about whom to pursue. It also results in the users who e-mailed the user who is perceived as attractive become dissatisfied because they did not receive a reply.

One particular type of online dating is known as "speed dating." Speed dating, consists of users meeting in a text-based chatroom and spending a fixed amount of time (e.g. 7 minutes) exchanging messages with each other in pairs, in a round-robin fashion. After each pair talks, they fill-out a form stating whether they would like to have additional information, such as a phone number, revealed to the other persons. At the end of the session, the results are compiled, and it is determined whether there was a match in both directions. If there was a two-way match, the additional information is revealed to the matching users.

Online speed dating, however, suffers from drawbacks as well. First, participants can communicate during the date only through text based instant messaging. Thus, as discussed previously, online speed dating suffers from the same problems as web-based text dating.

Second, participants must have an Internet connection with a Web browser that supports the proprietary instant messaging system.

Finally, online speed dating is inconvenient. Online speed dating is usually divided into events according to categories (e.g. 45–55 year old New Yorkers.) Potential participants must view a schedule of upcoming events, find an event that they are interested in attending, and then return to the Web site at that time. Thus, if a user wants to meet people from different categories, the user will have to wait for the next scheduled event in that category.

Telephone Based Dating

In telephone based dating systems, a person wishing to meet another person must make a telephone call to a phone number and listen to pre-recorded messages from others who are looking to meet people. After listening to the message of another that an individual finds interesting, he/she can leave a private voicemail message for them. The two users then exchange voicemails to get to know one another. A minority of services include a Web user interface that allows listening and recording of messages through the Internet.

However, telephone based dating services also suffer from a number of major inherent drawbacks. First, the sign-up process is not pleasant for most people, because they must record an ad. This ad will be heard by all potentially compatible people on the system, so there is pressure to make it very good. There is also a fear that someone with whom the user is known will listen to the ad and recognize the user. In practice, most people do not record a voice ad that portrays them in a particularly attractive light.

Second, telephone based services in general do not feature more than a few basic searchable categories, such as gender, age or type or relationship. The user is therefore forced to listen to many ads to find a few potentially compatible people. Listening to many ads quickly becomes a tedious process.

Third, it is difficult to tell what someone is like from just a voice message. In practice, the voice messages that people record are not a true reflection of their character.

Fourth, telephone based dating services are limited in geographic scope. Most telephone based dating services are provided through local systems, available in major metropolitan areas. Thus it is not possible to listen to messages from users in another area, even a neighboring area. Providers of these services publish different phone numbers to access each separate local system. This makes it difficult to develop a strong widespread brand or advertise on a nationwide basis.

Finally, telephone conversations are open-ended. There is no mechanism for scheduling live conversations, and there is no mechanism for determining if there is a mutual desire to get to know one another further.

For all of these reasons, an electronic dating system is needed that is convenient, easy to use, fast, private and effective.

BRIEF DESCRIPTION OF THE DRAWINGS

FIG. 7 is an example of a user interface illustrating telephony related attributes of a user profile.

DETAILED DESCRIPTION OF THE PRESENT INVENTION

Figure 1:
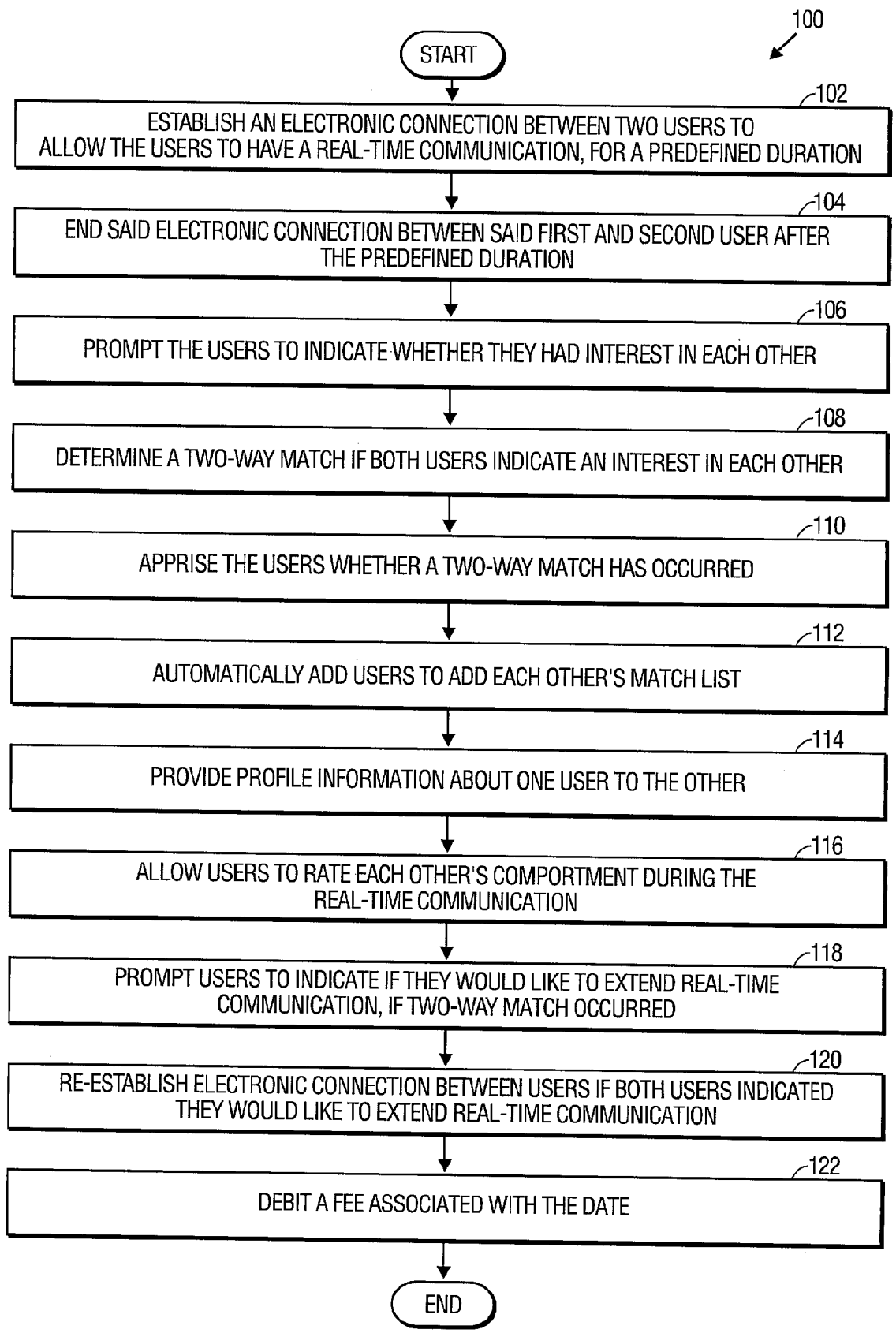
FIG. 1 is a flow-chart diagram of an embodiment of a method of dating according to the present invention

Disclosed is a novel system and method of connecting and matching people who date electronically. The present invention provides a mechanism for compatible individuals to communicate in real-time, for a set duration of time, and know if there was a mutual attraction. It also provides a convenient way for individuals to keep track of those users with whom there was mutual attraction, and facilitates subsequent communication with them without either individual having to reveal their phone number to the other.

In the following detailed description of the present invention, numerous specific details are set forth in order to provide a thorough understanding of the present invention. However, it will be apparent to one skilled in the art that the present invention may be practiced without these specific details.

GENERAL DEFINITIONS

Herein the term "date" or "dating" may refer broadly to the process of dating and match-making. The term "electronic dating" or "electronic dating service" should be construed as including any type of network, online, web-based, telephone, or other type of communication wherein individuals can communicate via an electronic medium and any type of service that allows such communication. The term "user" herein is a subscriber, or any person in any way utilizing an electronic dating service. Unless otherwise specified, users or persons who are electronically dating users are sexually compatible.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method procedures. The required structure for a variety of these systems will appear from the description below. In addition, the present invention is not described with reference to any particular programming language. It will be appreciated that a variety of programming languages may be used to implement the teachings of the invention as described herein.

Method

Real-Time Electronic Date

FIG. 1 is a flow-chart diagram of an embodiment of a method 100 of dating according to the present invention. The method 100, begins at processing block 102, by establishing an electronic connection between two users of an electronic dating service to allow the users to have a real-time communication, or, in other words, a live, person-to-person date. In exemplary embodiments, the electronic connection is an audio, video, or other live connection, such as a telephone call, an Internet ICQ, a video conference, etc. Quite often it is difficult for a user to assess another user and get a sense of what they are really like based on simply viewing a profile, exchanging e-mails, or text chatting through instant messaging. With live, real-time communication, compatible individuals have a very effective means of determining if they 'click' with each other.

Some users may feel that video may give an even richer dating experience. Other users may find that video provides a more effective way for the two individuals to assess one another. At the same time, some users may prefer only audio transmissions. An audio-only communication allows users to get to know each other in an intimate and comfortable way, and eliminates the pressure of having to meet face-to-face prematurely.

Figure 2:
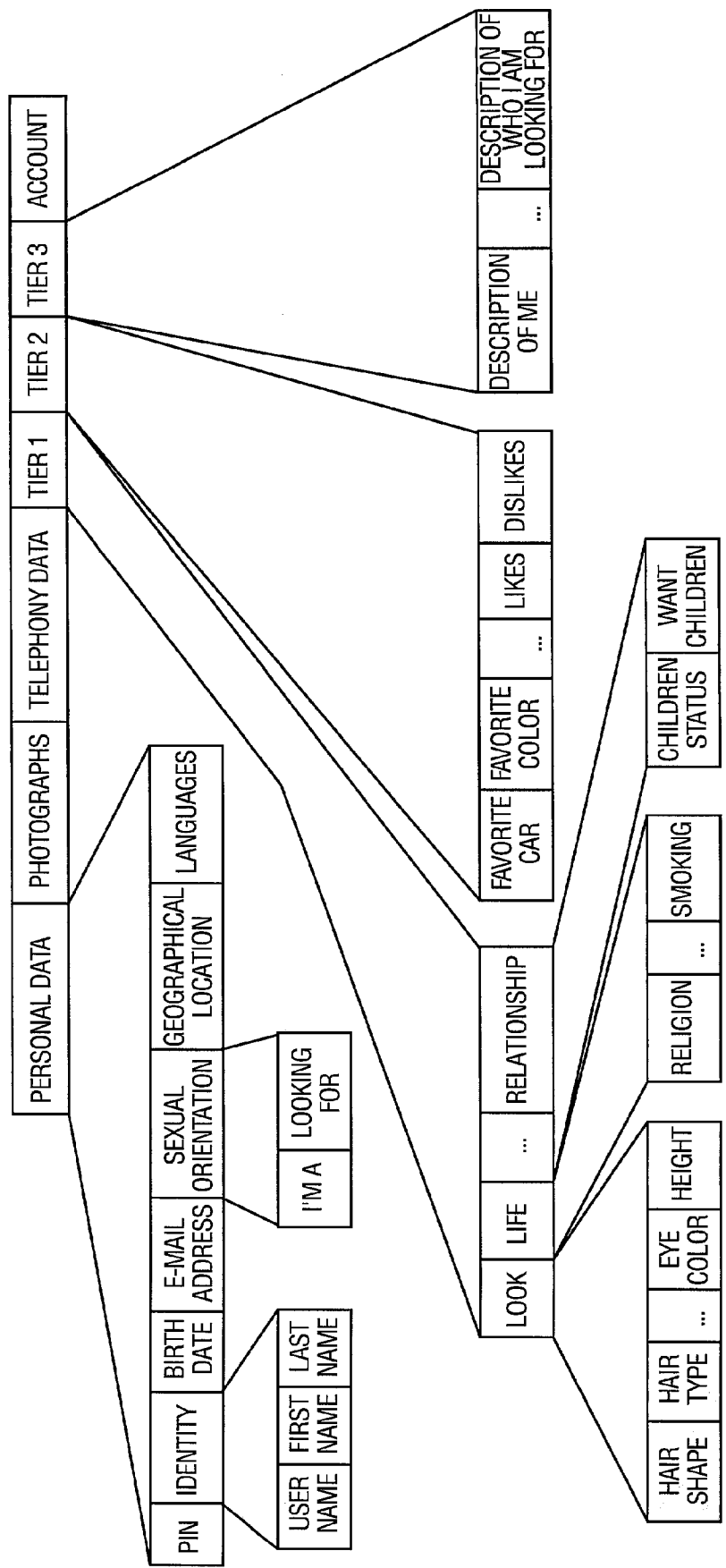
FIG. 2 is an illustration showing a user profile with attributes that may be maintained on a user.

In one embodiment of the invention, the users may be informed that a "date" is about to begin. In one embodiment of the invention, the identity of the users is announced, using text-to-speech processing. In another embodiment, the identity of the other user is announced by playing a pre-recorded audio clip of that user speaking their identity. In another embodiment, attributes of the other user as shown in FIG. 2 (such as age, geographic location etc.) are announced. In one embodiment of the invention, the users have not spoken to each other previously.

During the real-time communication, or "date", the users communicate person-to-person during a limited duration of time. The duration of time should be long enough to allow the users to spark up an interesting conversation, but not too long so that the users must agonize through small talk if there is no spark of interest. An advantage of keeping the date to a pre-defined duration is to provide structure for users who have trouble knowing how to spend their time on a date, thus encouraging the parties to begin communicating quickly and more meaningfully knowing that there is a limited time to the conversation. Another advantage of having a predefined duration to the date is to allow users to avoid the awkwardness or discomfort of trying to end a conversation that they have become uncomfortable with, or negotiate whether they would like to stay in contact or not. In one embodiment of the invention, the users themselves may agree to a particular amount of time. In one embodiment of the invention, this duration is set to be a standard amount, such as 5 minutes. During the date, in one embodiment of the invention, the users may be notified of the time remaining in the predefined duration of time that the date is expected to last.

Method 100, then continues at processing block 104, with ending the electronic connection between the users after the predefined duration. Method 100 then continues, at processing block 106, with prompting the users to indicate whether they had interest in each other. Next, at processing block 108, if both users indicate that they felt an interest in each other, a "two-way match" is determined. In other words, if both users indicate that they felt a mutual interest in each other, they are logically matched as compatible dating partners. Thus, one advantage is to provide a mechanism for two compatible individuals to talk in real-time, decide whether there was 'chemistry' between them and whether they should therefore invest more time in getting to know one another further.

In one embodiment of the invention, method 100 continues, as shown at processing block 110, with apprising, or notifying the users of whether a two-way match occurred. In one embodiment, each user is automatically added to the other's list of matched persons 112. A method of managing that list is described in further detail further below in conjunction with FIG. 6. One advantage of adding matched users to a list is to allow the "building-up" of a portfolio of two-way matches. Many users may feel a sense of pride about the people in their portfolio. Other users may view their portfolio as a safety net. For example, if an office party is approaching, the service provides a selection of people who have indicated their attraction who are candidates to accompany the user to the party.

In one embodiment of the invention, a profile can be maintained on the users. The profile may contain information about the user along with identification attributes. The user profile may be created when the user signs up for the dating service, whereupon they enter mandatory and optional attributes. The profile may contain information such as age, height, weight, race, religion, etc, to assist the users understanding of each other either before, during, or after the two-way match has occurred. FIG. 2 is an illustration showing a user profile with attributes that may be maintained on each user. The profile may further contain contact information, such as telephone number, email address, etc. Thus, in one embodiment of the invention, method 100 may continue with presenting profile information to the users, as shown at processing block 114, if a two-way match occurs. An advantage of not displaying profile information before a two-way match has occurred, is to preserve the privacy of the users, especially if one of them does not feel an attraction to the other and would not want further information about them revealed.

In one embodiment of the invention, method 100, may include an option to rate the user's comportment during the real-time communication, as shown at processing block 116. In one embodiment of the invention, a user is prompted to rate the other user's comportment only if the user indicated that they do not have interest in the other user.

In one embodiment of the invention, method 100 may continue by prompting the users to indicate whether they would like to extend the date, if a two-way match occurred, as shown at processing block 118. In one embodiment of the invention, method 100 continues, as shown at processing block 120, with re-establishing the electronic connection between the users, if both users indicated that they would like to extend the date.

In one embodiment of the invention, method 100 may include debiting a fee, associated with the date, from the user's account, as shown at processing block 122. More detail, regarding debiting a fee from a user's account, is provided in conjunction with FIG. 8.

The users above may greatly benefit from a method of participating in a real-time date according to several different styles of dating. The following methods—immediate dating, invited dating, and group dating—describe several different styles of dating which include the dating method described in method 100 above.

Immediate Dating Method

Figure 3:
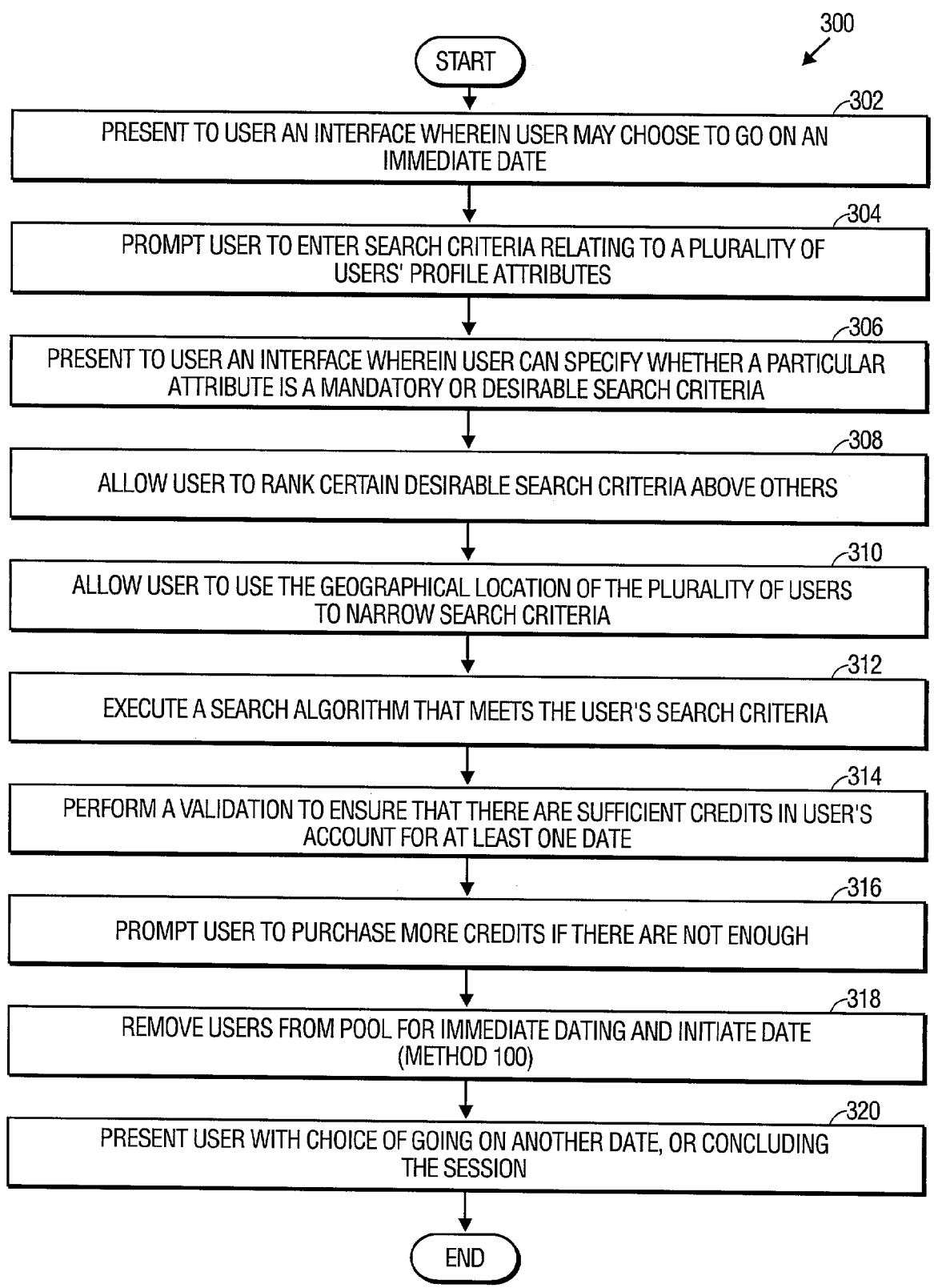
FIG. 3 is an illustration of an embodiment of a method of performing an immediate date, according to the present invention.

Many times, when a user subscribes to an electronic dating service, that user may wish to meet other users as soon as possible. That user, therefore, may utilize a method, referred to herein, as "immediate dating." FIG. 3 is an illustration of an embodiment of a method 300 of performing an immediate date, according to the present invention. Method 300 begins, at processing block 302, with presenting to the user an interface wherein the user may choose to go on an immediate date. The user is then prompted to enter their search criteria, said search criteria relating to compatible attributes in user profiles of a plurality of users, as shown at processing block 304. Examples of search criteria include age range, geographic location of the users they would like to meet, etc. In one embodiment of the invention, as shown at processing block 306, the user is presented a user interface wherein the user may specify whether a particular search criteria (i.e. physical attribute, age, religion, etc., see FIG. 2) is a mandatory or "desirable" search criterion. In one embodiment of the invention, the user may be allowed to rank certain desirable search criteria above others, as shown at processing block 308. For instance, if a user has two desirable search criteria, such as "blonde hair" and "blue eyes", but one is more important than the other, then the user may rank the "blonde hair" criteria a certain value higher than the "blue eyes" search criteria. In one embodiment of the invention, the user may be allowed to arbitrarily set up his or her own ranking scale. In another embodiment, however, a pre-constructed ranking scale may be presented to the user. In one embodiment of the invention, the user may be connected via a wireless device that can detect the current geographic location of the user. Thus, as shown at processing block 310, the user may be allowed to use the geographic location of the users to narrow their search criteria.

Next, as shown at processing block 312, a search algorithm is executed that meets the user's search criteria. In one embodiment of the invention, the search algorithm may flow as follows: (a) determining other compatible users that are also taking part in Immediate Dating; and (b) determining if specified search criteria, from both users, are met in both directions i.e. the current user's criteria are met by a candidate user, and the candidate user's search criteria are met by the current user. The search algorithm must be able to consider ranked criteria specified by the user. For example, where users specify only an age range and geographic location as search criteria, the first pair of users who meet the search criteria (a), (b), may be selected for a date. However, if the user specifies a combination of mandatory and desirable search criteria, the search algorithm will have to be more intelligent and thus use the user's rating criteria or utilize a pre-constructed ranking scale to determine which criteria may be more important than other criteria. Hence, the algorithm may further include (c) scoring compatible users based on how close the desirable criteria match in both directions, then (d) selecting users with the highest score for a date.

In one embodiment of the invention, the search algorithm may further include, (e) determining if users have previously been on a date with each other. An advantage of not allowing users to date more than once is to ensure that users will meet only new people. In this case, an additional search constraint is imposed.

Next, as shown at processing block 314, a validation is made to ensure that there are sufficient credits in the user's account for at least one date, based on the estimated time for a complete date. If there are not enough credits, the user is prompted to purchase some, as shown at processing block 316. If there are sufficient credits, the user the user is allowed to proceed.

Next, after the search algorithm has been executed to pair two users for a date, and the account validation has been made, that pair of users is removed from the pool of users available for Immediate Dating, as shown at processing block 318, and a date is initiated as described in method 100.

In one embodiment of the invention, as shown at processing block 320, after the date is completed, each user is presented with the choice of going on another date, or concluding the session. If a user elects to go on another date, a validation is performed to ensure that there are enough credits in the user's account for at least one date, based on the estimated time for a complete date, as described above at processing block 314. If there are not enough credits, the user is prompted to purchase some, as described above at processing block 316. If there are sufficient credits, the user is placed back in the pool of users available for Immediate Dating and the process repeats.

Thus Immediate Dating provides a way for a user to meet another compatible user as soon as possible, and repeat the process as much as he/she desires. The speed at which compatible users are paired according to the above search algorithm depends upon the volume of users on the system, and how narrow the search criteria are. In one embodiment of the invention, the user will be informed if no compatible users were found after a predefined timeout period (e.g. 15 minutes). The user will be given the option of continuing to search, or aborting the Immediate Dating session.

Invited Dating Method

Figure 4A:
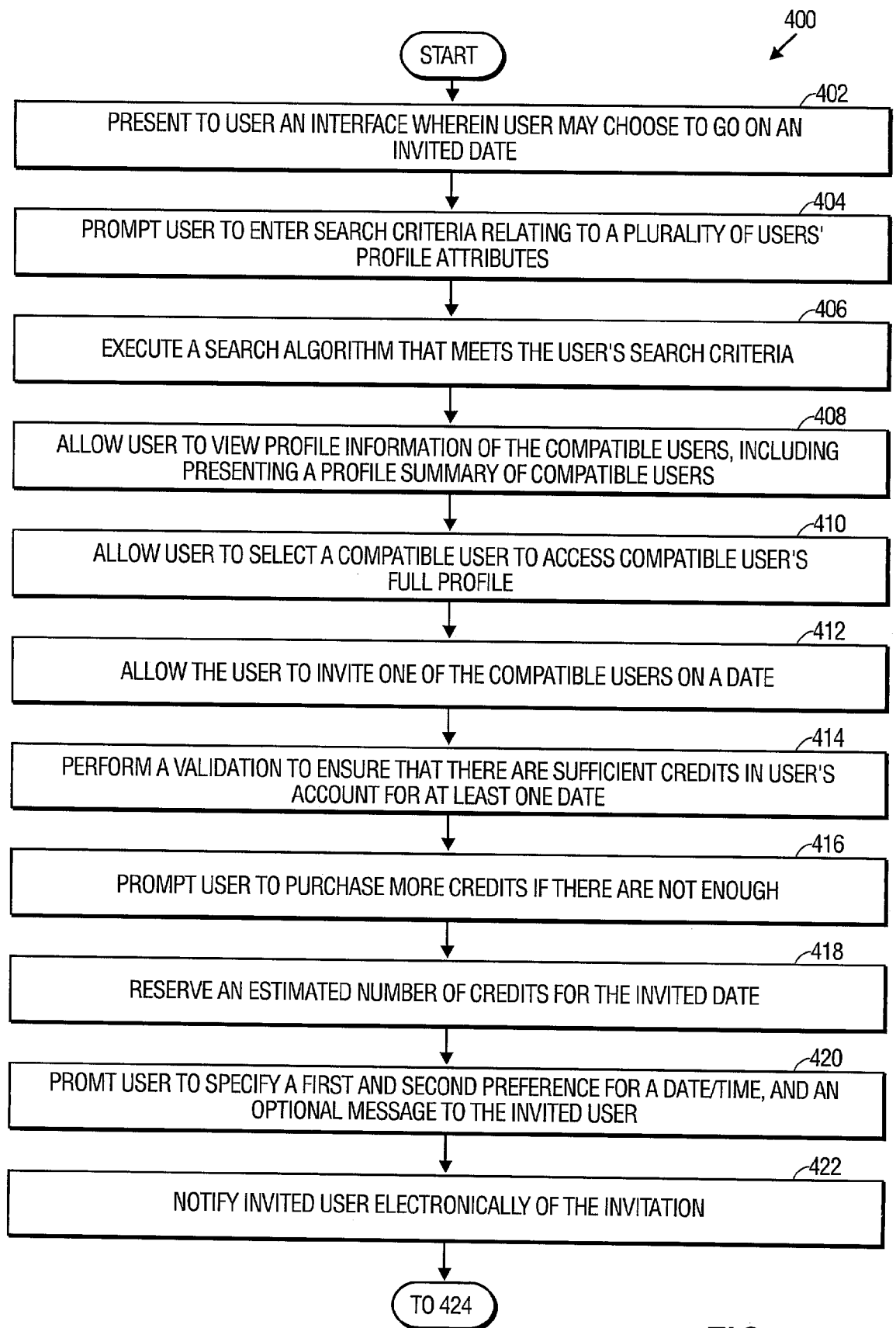
FIG. 4 is an illustration of an embodiment of a method of performing an invited date, according to the present invention.
Figure 4B:
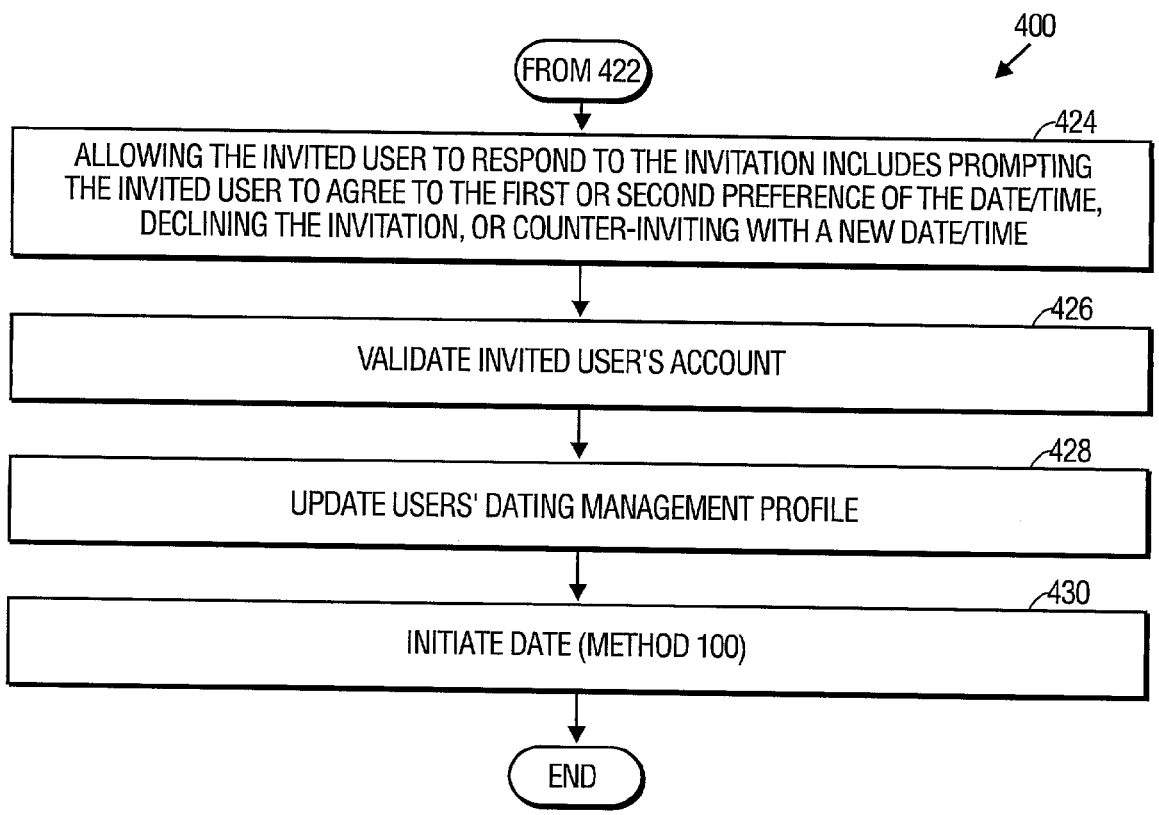

Many times, when a user subscribes to an electronic dating service, that user may wish to invite other users on a future date. That user, therefore, may utilize a method, referred to herein, as "invited dating." FIG. 4 is an illustration of an embodiment of a method 400 of performing an invited date, according to the present invention. Method 400 begins, at processing block 402, with presenting to the user an interface wherein the user may choose to go on an invited date, whereupon the user is then prompted to enter search criteria, as shown at processing block 404. A search is then executed, as shown at processing block 406. Searching methods may include any or all embodiments in conjunction with immediate dating described above. Method 400, may continue with presenting to the user a list of compatible users with a summary of search results, as shown at processing block 408. In one embodiment of the invention, the summary may display key details of the users profile, namely: Identity, age, geographic location, look attributes, and a photograph. Method 400, may then continue, as shown at processing block 410, with allowing the user to select a compatible user to access the user's full profile.

The present user can select to invite one of the compatible users on a date, as shown at processing block 412. The invited compatible user will hereafter be referred to as an "invited" user. In one embodiment of the invention, as shown at processing block 414, a validation is performed to ensure that the inviter has sufficient credits for the date. If not, the user may be prompted to purchase more credits, as shown at processing block 416. If they do have sufficient credits, as shown at processing block 418, an estimated number of credits for the date are reserved, since the date is in the future.

Next, as shown at processing block 420, the user is prompted to enter the date/time for their first preference, an optional second preference date/time, and an optional message. Then, as shown at processing block 422, the invited user is notified electronically of the invitation. In one embodiment of the invention, the invitee receives an e-mail informing them of the invite. In another embodiment, the invitee receives a voicemail informing them of the invite. The invited user may then be allowed to respond to the invitation, as shown at processing block 424, by agreeing to date/time preference 1, agreeing to date/time preference 2, declining the invite, or canceling the current invite and counter-inviting. Then, as shown at processing block 426, the invited user's account may be validated to ensure that they have sufficient credits for the date. If counter-invite is selected, a new invite is created where the inviter is the invitee of the original invite, and the invitee is the inviter of the original invite. If the invitee declines or counter-invites, any credits reserved in the inviter's account are un-reserved. Furthermore, as shown at processing block 428, an entry is made in the upcoming dates and events section of the user's dating management area, described in conjunction with FIG. 6 below.

At the correct start time, as shown at processing block 430, a date is automatically triggered between the two users, as described above in method 100.

Thus Invited Dating provides a way for a user to meet another compatible user at some point in the future that is convenient for both users.

Group Dating Method

Figure 5A:
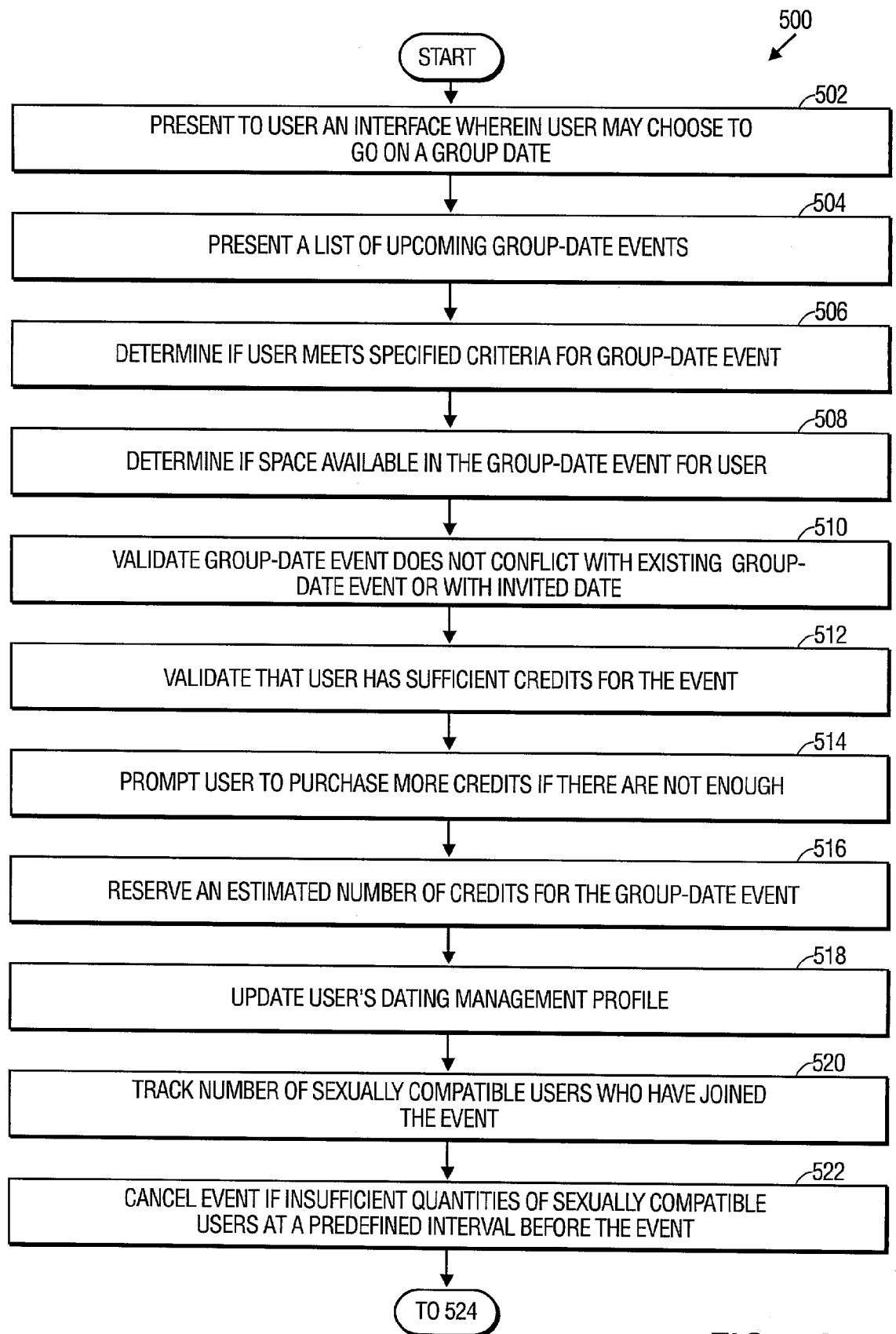
FIG. 5 is an illustration of an embodiment of a method of participating in a group date, according to the present invention.
Figure 5B:
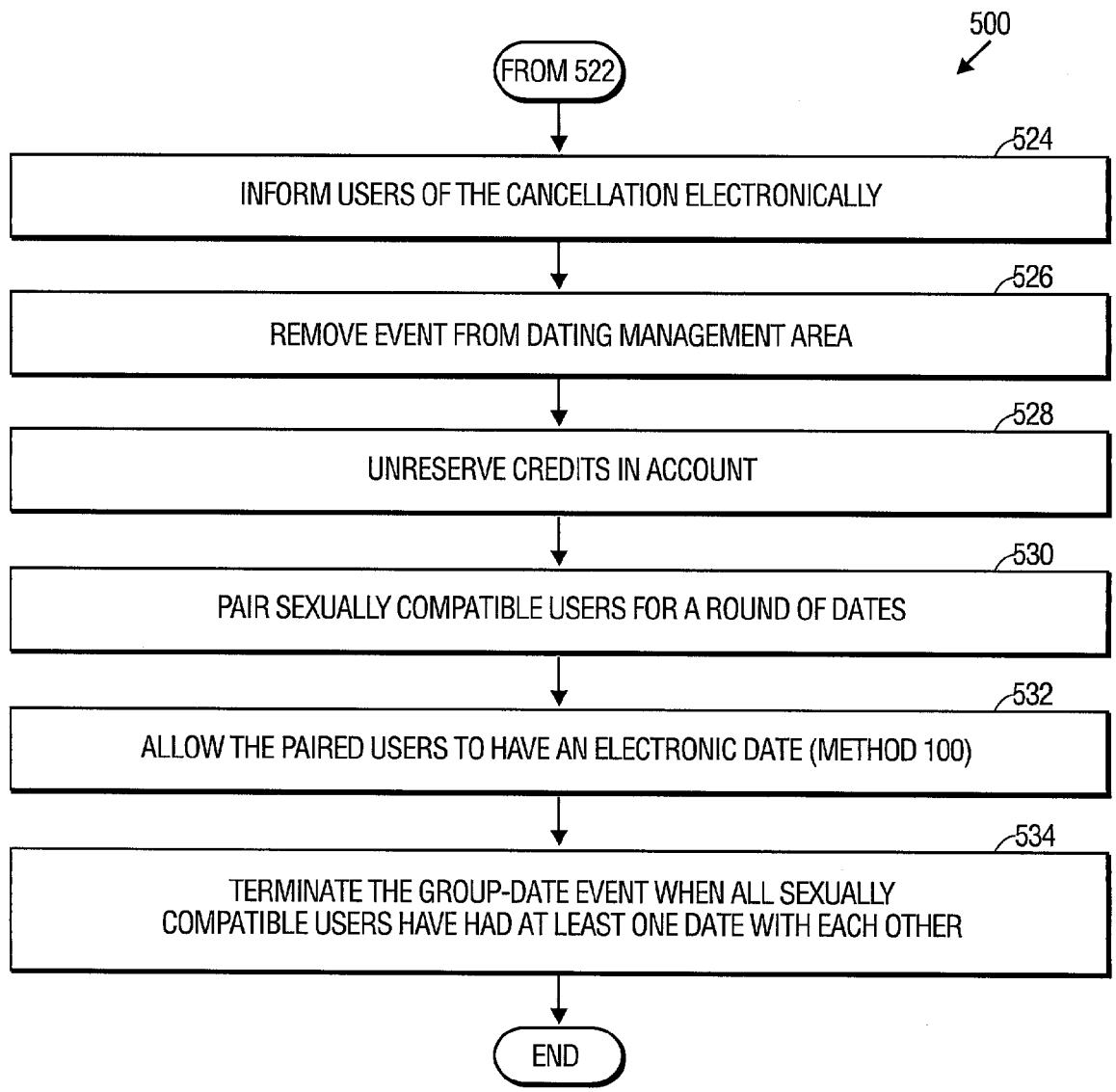

Many times, when a user subscribes to an electronic dating service, that user may wish to participate in a group date. That user, therefore, may utilize a method, referred to herein, as "group dating." FIG. 5 is an illustration of an embodiment of a method 500 of participating in a group date, according to the present invention. Method 500 begins, at processing block 502, with presenting to the user an interface wherein the user may choose to go on a group date. Next, at processing block 504, the user is presented with a list of upcoming group-date events. In one embodiment of the invention, group-date events may require that the users meet certain criteria depending on their user profiles. For instance, a group event may be strictly for Asian people living in San Francisco aged 23–26. Thus, method 500 continues at processing block 505 with determining if the user meets specified criteria for the group-date event.

In one embodiment of the invention, the list of upcoming group-date events may include presenting descriptive fields such as event description, event start date/time, event status, number of dates, or number of places remaining. In one embodiment of the invention, the events are listed reverse-chronologically. In another embodiment, they are listed by how narrow the criteria for the event are. For example, an event for Asian people living in San Francisco aged 23–26 would be listed ahead of another event for Asian people living in Northern California aged 20–30.

Next, at processing block 506, method 500 continues with determining if there is space available in the group-date event for the user. If there are still places remaining on an event, the user will have the opportunity to select that event to join it, as shown at processing block 508. In one embodiment of the invention, as shown at processing block 510, a validation is performed that the event does not conflict with an existing group-date event or with an invited date. In one embodiment of the invention, as shown at processing block 512, a validation ensures that the user has sufficient credits for the event. They will need sufficient credits for the product of the number of dates in the event and the estimated length of a constituent date. If the user does not have sufficient credits, they are prompted to purchase more, as shown at processing block 514. If the validations pass, the estimated number of credits for the event are reserved, and the user is added to the event as shown at processing block 516. Furthermore, as shown at processing block 518, and an entry is made in the upcoming dates and events section of the user's dating management area, described in conjunction with FIG. 6 below.

In one embodiment of the invention, the number of compatible users (e.g. heterosexual men and heterosexual women) who have joined the event are tracked, as shown at processing block 520. If there are insufficient quantities of compatible users at a predefined interval before the event, the event is canceled, as shown at processing block 522. In this case, the users who had joined the event are informed of the cancellation electronically, shown at processing block 524 (e.g. by e-mail, phone call, etc.), and the event is removed from their dating management area, shown at processing block 526. In one embodiment of the invention, the credits that had been resolved in their accounts are un-reserved, shown at processing block 528.

Shortly before the event start time, the system pairs compatible users for a round of dates, as shown at processing block 530. Then, as shown at processing block 532, method 500 continues with allowing the paired users to have an electronic date. The date may follow method 100 as described above. When the round of dates is complete, another round may take place, with new pairings, such that every user goes on a date with a compatible user with whom they have not previously gone on a date with. This process of consecutive dates continues until the number of dates in the event has been met. Thus method 500 continues, at processing block 534, with terminating the group-date event when all compatible users have had at least one date with each other. In one embodiment of the invention, each date within the event causes a separate call to be made to each user. In one embodiment of the invention, only one call is made to each user at the start of the event, and all dates take place on that same call.

Thus Group Dating provides a way for a user to meet several other compatible users in succession within a predefined timeframe, thus providing a very efficient way for individuals to meet a large number of compatible individuals in a short space of time.

Dating Management Method

Figure 6:
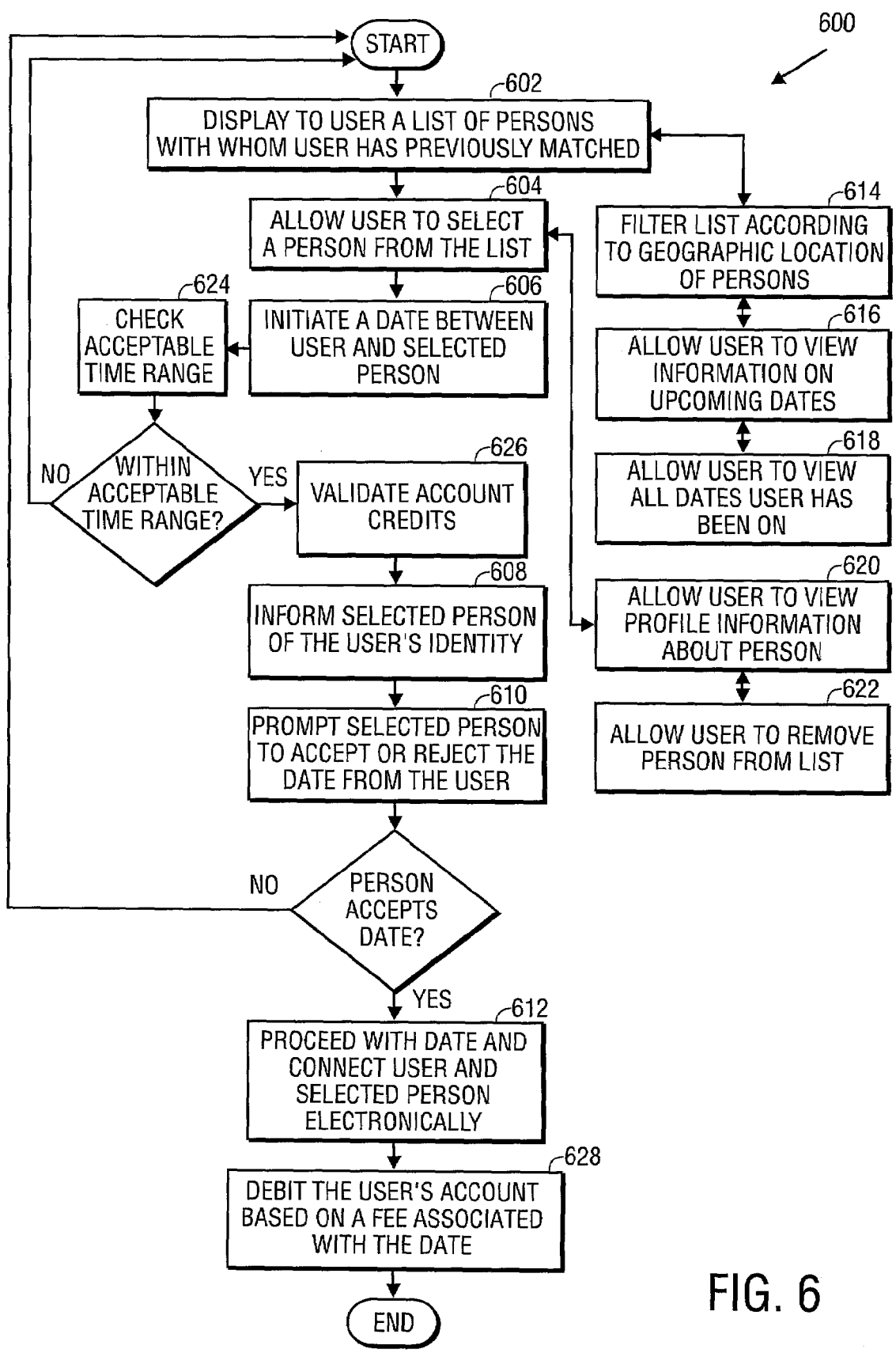
FIG. 6 is a flow diagram of an embodiment of a method for managing dates according to the present invention.

FIG. 6 is a flow diagram of an embodiment of a method 600 for managing dates according to the present invention. Referring to FIG. 6, method 600 begins, at processing block 602, with displaying to a user the list of persons with whom the user has previously matched. In embodiment, the user may create this list of compatible persons by adding two-way matches as determined in method 100, described in detail above.

Next, at processing block 604, the user is allowed to select a person from the list. Then, at processing block 606, an unlimited duration date is initiated between the user and the selected person. Method 600 may further continue with, informing the selected person of the user's identity, as shown at processing block 608; prompting the selected person to accept or reject the date from the user, as shown at processing block 610; and, if the person accepts, connecting the user and the person electronically, as shown at processing block 612. The user and the selected person may then engage in stimulating conversation, without a predefined duration. The electronic connection may be an audio, video or audio-visual real-time connection between the user and the selected person. One advantage of method 600 is that it provides a convenient way for individuals to keep track of those users with whom there was mutual attraction, and facilitates subsequent communication with them.

In one embodiment of the invention, the user may be allowed to maintain a profile that contains information about them and their preferences, as discussed above in conjunction with FIG. 1. In one embodiment of the invention, the selected person's profile is integrated with the user's match list, and vice versa, so that the match list may display profile information about the selected person, such as the identity attributes (e.g. age, geographic location, etc.) or the date and time of previous two-way matching, before, during, or after the electronic connection is established, as shown at processing block 620. In one embodiment of the invention, the user or person, can restrict what information allowed to be seen, thus can be kept entirely private, without either individual having to disclose private information to other users such as their phone number. Thus a user is offered a lot of privacy. For instance, users can get to know one another and develop a relationship by engaging in unlimited length anonymous telephone conversations, without having to reveal their true phone number.

In one embodiment of the invention, the profile information may include a time range when the selected person is willing to receive an electronic connection. Thus, in one embodiment of the invention, as shown at processing block 624, method 600 may further include determining if the date is being initiated within the acceptable time range, and completing the date, or establishing an electronic connection, only if within the time range. FIG. 7 is an example of a profile that includes profile information as discussed above. An advantage of allowing the user, or person, to specify an acceptable time when they can be contacted is that it allows a lot of control over when they communicate with other users.

The users may be utilizing the present invention via one, or a combination, of many different types of networks, such as the Internet or a telephone network. In many cases such networks may be wireless, and therefore mobile. Consequently, it would be advantageous for the user to know if the persons on the list were in the geographic area. Thus, in one embodiment of the invention, as shown at processing block 614, method 600 may further include determining the current geographic location of the user and the persons on the user's list, and filtering the list to display only those people who are in the geographic vicinity of the user. Where the user is connected via a wireless device and that device or its network supports location detection, the invention provides a convenient way for individuals to keep track of those users with whom there was mutual attraction who are in the current vicinity of the user, and it facilitates subsequent communication with them.

Depending on the ensuing conversation, or for any other reason, in one embodiment of the invention, the user is allowed to remove the selected person from the matched list, shown at processing block 622. In one embodiment of the invention, the user may be allowed to compile a list of persons removed from the matched list to add them back to the matched list at a later date.

Figure 8:
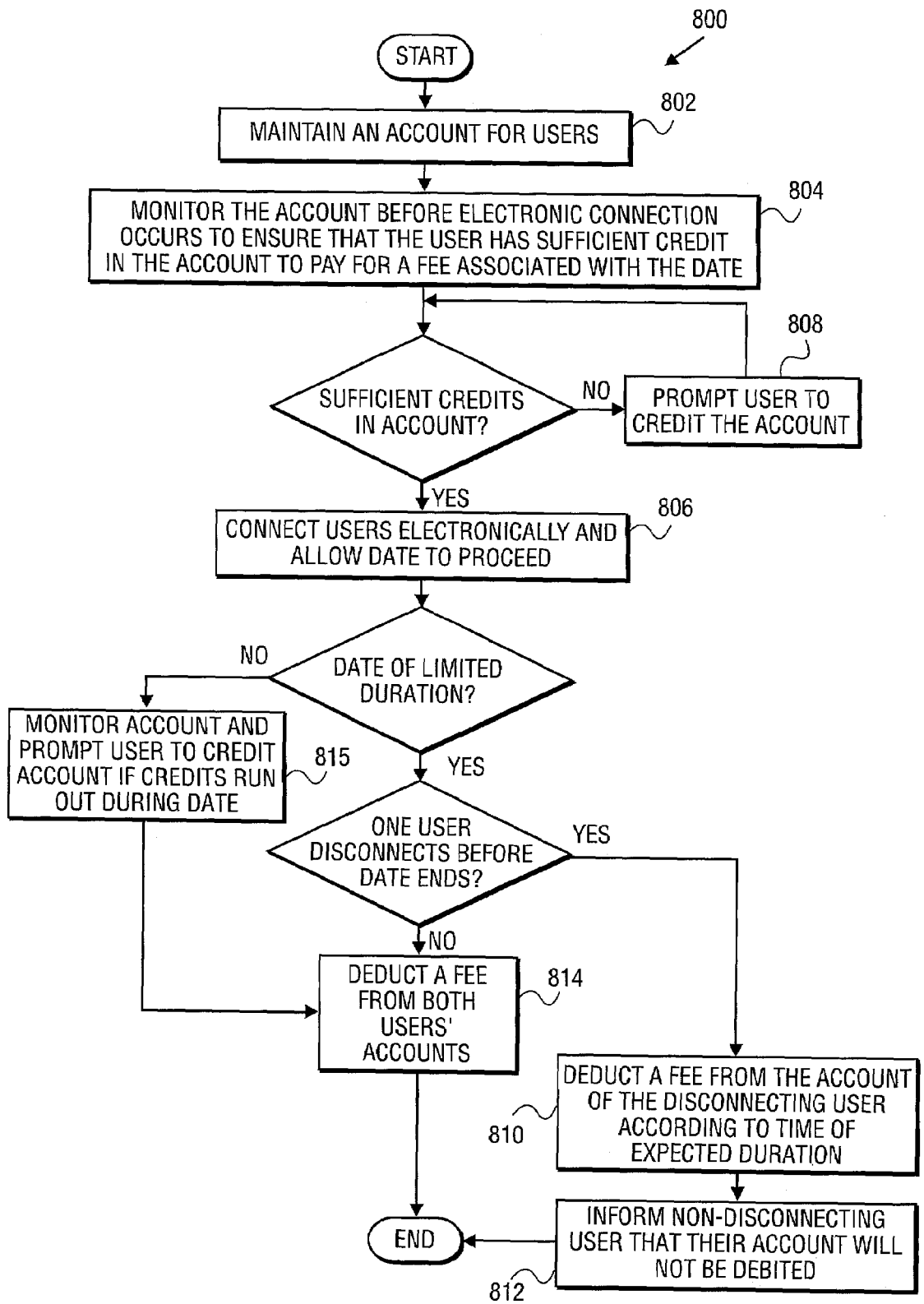
FIG. 8 is a flow diagram of an embodiment of a method for utilizing an account in the present invention.

In one embodiment of the invention method 600 includes validating the user's account before the date to ensure that the account has sufficient credit, shown at processing block 626, or debiting the user's account based on a fee associated with the date, shown at processing block 628. FIG. 8 is a flow diagram of an embodiment of a method 800 for utilizing an account in the present invention. Method 800 begins, as shown at processing block 802, with maintaining an account for the user and the person. The account may allow payment by credit card, or other forms of electronic payment, to add credits to the account. In one embodiment of the invention, a user may purchase credits by supplying credit card information, and their card is charged for the cost of credits purchased. A user's credit card details may be kept on file which makes it easier for them to purchase more credits in the future. A user can request a statement of account, which presents credits such as purchases or free credit awards, and debits.

Next, as shown at processing block 804, method 800 continues with monitoring the account before the electronic connection occurs to ensure that the user who is about to go on a date has sufficient credit in the account to pay for a fee associated with the date. If the account has sufficient credits, then the users can be connected electronically and have a date, as shown at processing block 806. If the account is insufficient, then the user is prompted to credit the account with an amount sufficient to cover the fee associated with the date, as shown at processing block 808.

The fee associated with the date can be determined in many different ways. For instance, in one embodiment of the invention, the fee is based on the actual length of the date, that is, the time the users are actually conversing. In another embodiment, if the users are involved in a date according to method 100, the fee may be based on the time of the predefined period, such as from the time the real time connection is established to the time it ends, or to the time of a matching response. If one of the users disconnects before the predefined duration of the date ends, then method 800 may continue, as shown at processing block 810, with deducting a fee from the account of the disconnecting user, based on the time the predefined duration was expected to be. The non-disconnecting user may then be informed that their account will not be debited, as shown at processing block 812. However, if both users complete the date, then a fee can be deducted from both or either user's account(s), as shown at processing block 814. If the date is not of a pre-defined duration, but rather of an unlimited-length duration, then the account may be monitored to ensure that if credits run out during the unlimited-length date, the users can be prompted to further credit the account, as shown at processing block 815.

Referring back to FIG. 6, in one embodiment of the invention, as shown at processing block 618, method 600 may further include allowing the user to view all the dates that a user has been on whether a two-way match occurred or not, and any information provided by the user, or person, regarding the date. Date information may include any or all information determined in conjunction with methods previously described herein. In one embodiment of the invention, the user may be allowed to view upcoming dates and any information associated, as shown at processing block 616 with them. Information for upcoming dates may include any or all information determined in conjunction with methods previously described herein, such as status of the date, date/time of date, estimated duration of date, notes, etc.

System Apparatus

Figure 9:
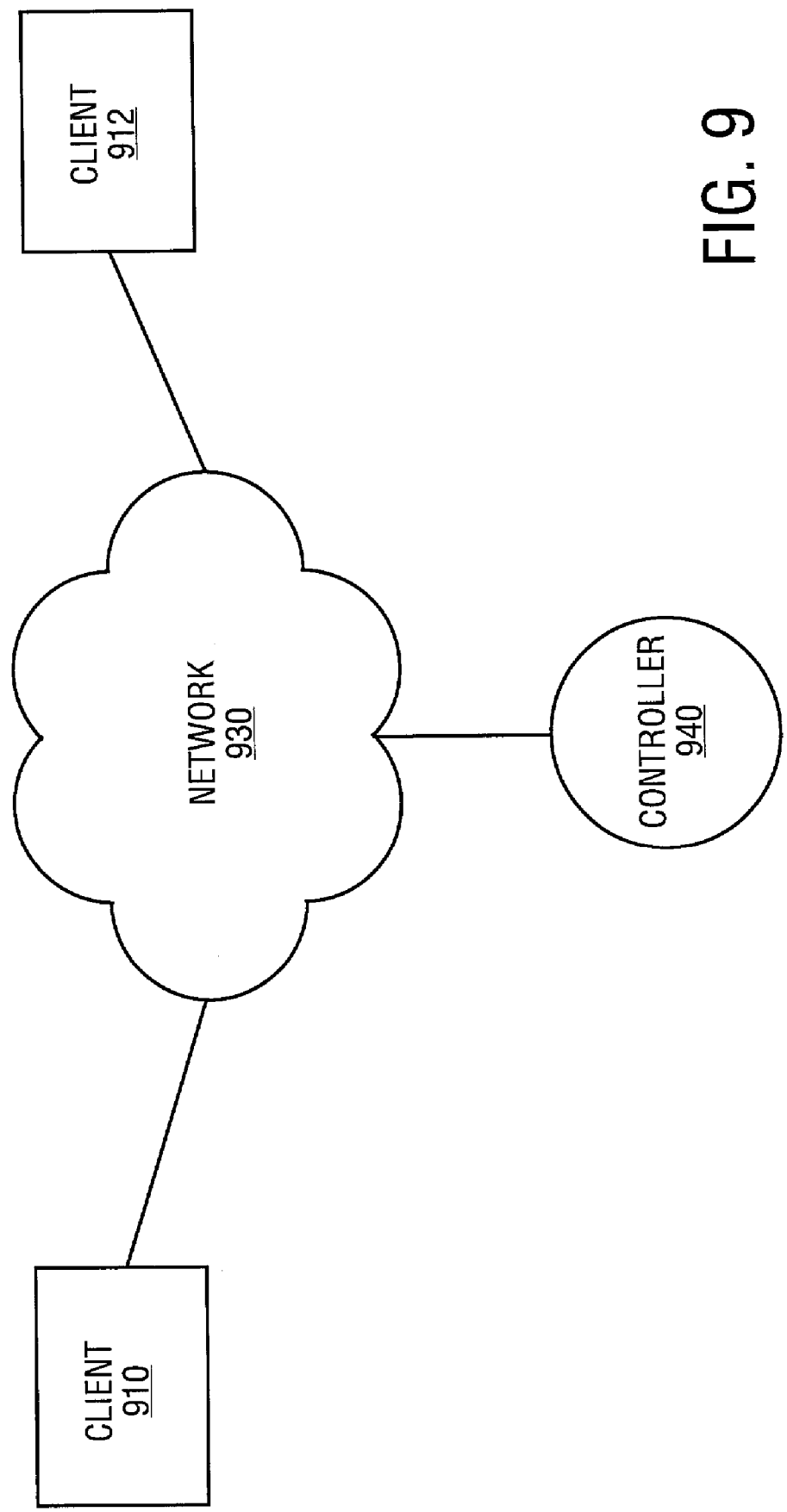
FIG. 9 is a block diagram of an embodiment of a system according to the present invention.

FIG. 9 is a block diagram of an embodiment of a system 900 according to the present invention. Referring to FIG. 9, a client device 910, or first user, of a dating service can communicate with another client device 912, or second user, of the dating service via a network 930. A controller 940 is to monitor and direct the flow of communication between the first and second user. The controller 940 can be one of many types of devices such as soft switches, voice servers, telephony servers, Web servers, application servers, database servers or a combination thereof. However, for brevity, any, or all, of these devices may be referred to, herein, as simply a controller 940, which is a device that can monitor and control the flow of communication between the client/users, 910 and 912.

System 900 may be a centralized architecture—users spanning a wide geographic area connect to a single system. In today's increasingly mobile world, people are increasingly inclined to explore further from their locality to find a good match. A centralized architecture provides for a very high level of scalability. System 900, however, may also be a very localized type of architecture.

In one embodiment of the invention, system 900 operates using a call-back system, so that a user receives calls rather than having to place them. In another embodiment, the user places calls to the service by dialing a central toll free number that has wide geographic coverage.

Figure 10:
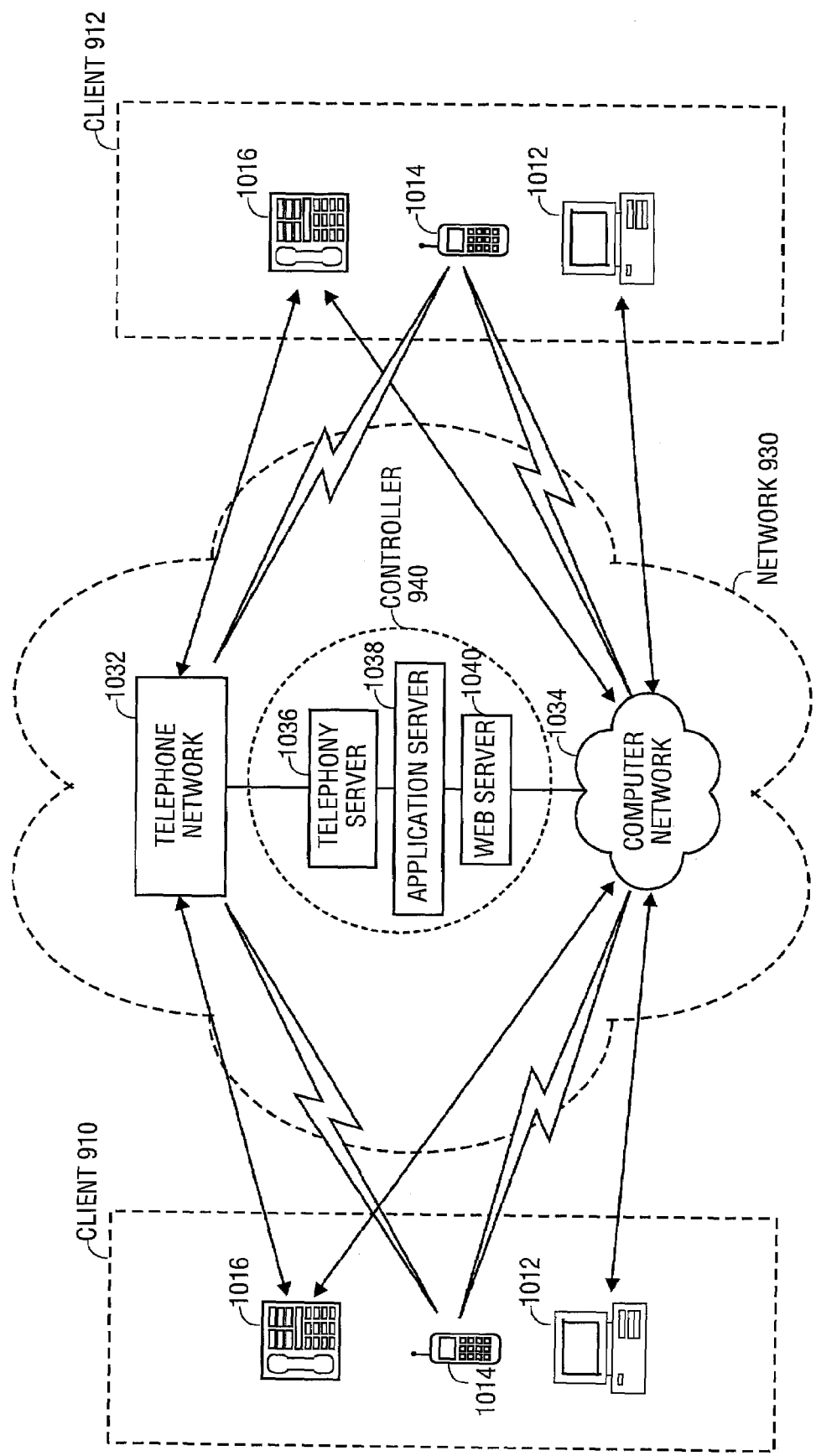
FIG. 10 is a block diagram of one embodiment of a system according to the present invention.

FIG. 10 is a block diagram of one embodiment of a system 1000 according to the present invention. In one embodiment of the invention, the users connect via the Internet while utilizing a computer device 1012 capable of running browsing software, such as a personal, hand-held, laptop, or palm-held computer. The computer devices may include video transmission capabilities (e.g. webcam, video recorder, etc) and audio transmission capabilities (e.g. speakers, microphone, etc.). In one embodiment of the invention, the computer device may be connected to a public or private computer network 1034. An example of a public network well suited to electronic dating is the Internet. However, system 1000 may also be connected to a private computer network.

In one embodiment of the invention, clients 910 may be any one of landline phone devices 1016 and wireless phone devices 1014 connected to each other via a telephone network 1032. The telephone network may be landline or wireless, thus capable of being connected to by a landline phone device 1016 or a wireless phone device 1014. In another embodiment, the clients 910 may be computer devices 1012, such as a PC or a Personal Digital Assistant (PDA), with audio or visual capabilities, connected to each other via a computer network 1034. In another embodiment, the clients 910 may be connected to each other via a combination of the telephone network 1032 and the computer network 1034. In yet another embodiment, clients 910 may be hard phones, devices that look and act like telephones but plug into the computer network 1034 rather than the telephone network 1032. In addition wireless networks (e.g., wireless LANs) are becoming increasingly more prevalent. Therefore, in one embodiment of the invention, wireless telephone devices 1014 may be connected directly to the computer network 1034.

In one embodiment, the users may connect via the telephone network 1032 utilizing a telephony server 1036. The user interacts with the system using a voice user-interface via a telephone, which transmits the voice data between the user and the telephony server 1036.

The telephony server 1036 can transmit data to the user using either prerecorded voice prompts or a text-to-speech engine, and the user can transmit data either by speaking or by using Dual-Tone Multi-Frequency ("DTMF") tones, both of which are recognized by the telephony server 1036. In one embodiment of the invention, voice-recognition technology is used at user inputs, providing the user with a hands-free way of interacting with the dating service and meeting people, which is useful when operating a vehicle for example. Furthermore, because voice and DTMF user interfaces may be used, almost all of the features that are normally available via a Web browser user interface can be accessed through the telephone. This expands the potential usage and potential ubiquity of the system. This is especially important for older demographics who do not have Internet access, or in countries where Internet penetration is low.

The telephony server 1036 can also provide the ability to place and receive calls using Internet telephony across the Internet, using VoIP, SIP and similar protocols. The telephony server 1036 also can provide voice store and forward, digit capture, text to speech, voice recognition, out-bound dialing and call progress analysis. The telephony server 1036 can also provide soft-switch capabilities, that is, the ability to make telephone and optionally video connections that are controlled by software. Furthermore, the telephony server 1036 can also provide the ability to bridge calls between the telephone network and the Internet. The telephony server 1036 may be provided either by the online dating service itself, or by a third party telephony hosting vendor. In the latter case, a data link between an application server 1038 and telephony server 1036 is likely to be via the Internet and the language used to control the telephony server may be VoiceXML, CallXML or a similar language.

In another embodiment of the invention, the users may connect through the combination of a telephone network 1032 and a computer network 1034, utilizing the telephony server 1036 in conjunction with any one of an Application server 1038 and a Web server 1040. For instance, a user may be accessing the system via a computer running Web browser software and a landline telephone. Another example would be a user accessing the system via a wireless device that provides both telephone and Web browsing functionality in the same device. These are sometimes referred to as "converged devices". The ability to operate Web browsing functionality need not be simultaneous with operating the telephone functionality, although the ability to have simultaneous Web browsing and telephony is an advantage. The connection to the Internet and telephone network may be provided by one or more third parties using current generation wireless networks, or "next generation networks" known as 2.5G, 3G or 4G. Devices which combine the functions of a mobile phone and Web browsing in a single device are becoming increasingly popular. Certain embodiments of the present invention, therefore, are ideal for such devices, since they make use of both mobile communication and web browsing.

In one embodiment of the invention, the controller 940 is to establish an electronic connection/call ("call") between a first and second user ("users") to allow the users to have a real-time communication, or a "date". In one embodiment of the invention, the controller 940 places a call to a user, over the network, at the request of the calling user. However, if users are already connected to the network, the controller 940 would not need to place a call to that user, but merely connect the users. Once connected, the controller 940 may somehow inform the users that their date is about to begin. In one embodiment of the invention, the controller 940 announces the identity of the other users, using text-to-speech processing. In another embodiment, the identity of the other user is announced by playing a pre-recorded audio clip of that user speaking their identity.

In one embodiment of the invention, the controller 940 is to interface with a database that holds profile information about the users. Thus, in one embodiment of the invention, the controller 940 is to provide one or more attributes of profile data about one user to another user.

In one embodiment of the invention, the controller 940 is to monitor and control the duration of the date between the users. In one embodiment of the invention, the duration of the date is according to a predefined amount of time. This duration may be a system-wide parameter that applies to all dates on the system, such as 5 minutes. The optimal setting is one where the majority of users find that it is short enough that they do not have to spend too much time talking to someone whom they do not intend to pursue, and long enough that they do not feel they are being cut-off prematurely if they are having a conversation with someone whom they do intend to pursue.

In one embodiment of the invention, the controller 940 is to disconnect the two users after the duration of the date. However, the users need not be disconnected from the controller 940.

In one embodiment of the invention, the controller 940 is to inform the users, at a predefined interval before the end of the users' date, of the amount of time remaining. This pre-defined interval may be a system-wide parameter, such as 1 minute.

In one embodiment of the invention, the controller 940 is to prompt the users to indicate whether they had interest in each other such that they would like to keep in touch with each other. Each user may respond with 'Yes' or 'No', input either by voice or DTMF. If both users respond affirmatively, then the controller 940 records a "two-way match". In one embodiment of the invention, each user may have a list of matches, and the controller 940 will place each user on the other's match list if both user's responded affirmatively.

In one embodiment of the invention, the controller 940 is to report the matching outcome to each of the users. This may be done by sending an email to the users, updating an electronic file or database that the user can check later, or informing the users directly over the telephone. The report may include information such as the date and time of the date, the identity of the other user (e.g. username, first name, last name, etc.), certain important profile information such as age and geographic location, and the matching outcome, which will indicate if there was a two-way match or not.

In one embodiment of the invention, the controller 940 is to prompt each user to rate the other's comportment during the date. In one embodiment of the invention, the user may responds with 'Yes' or 'No', input either by voice or DTMF tones. In another embodiment, the users respond through email or an online form.

In one embodiment of the invention, the controller 940 is to interface with a database that holds account information about the users. The controller 940 may then automatically debit the account for fees associated with dates.

In one embodiment of the invention, the controller 940 is to display to a user a list of persons, which persons have been previously matched with the user, to allow the user to select a person from the list; and to initiate a date between the user and the person. In one embodiment of the invention, the controller 540 is further to inform the person of the user's identity, prompt the person to accept or reject the date; and to establish an electronic connection between the user and the person.

In one embodiment of the invention, the controller 940 is to allow the user to search through a database of user profiles, the user profiles having identifying criteria, so that the user can match identifying criteria within the profiles.

The user profiles may include a time range when a person will accept a date. Thus, in one embodiment of the invention, the controller 940 is to determine if a date is being initiated within the acceptable time range.

In one embodiment of the invention, the controller 940 is to detect the current geographic location of persons on the user's match list, and to filter the list to display only those persons who are in geographic vicinity to the user.

In one embodiment of the invention, the controller 940 is to allow the user to remove persons from their match list, display the removed persons, and add removed persons back to the list.

In one embodiment of the invention, the controller 940 is to allow users to go on immediate dates, invited dates, or group dates.

Computer Architecture

Figure 11:
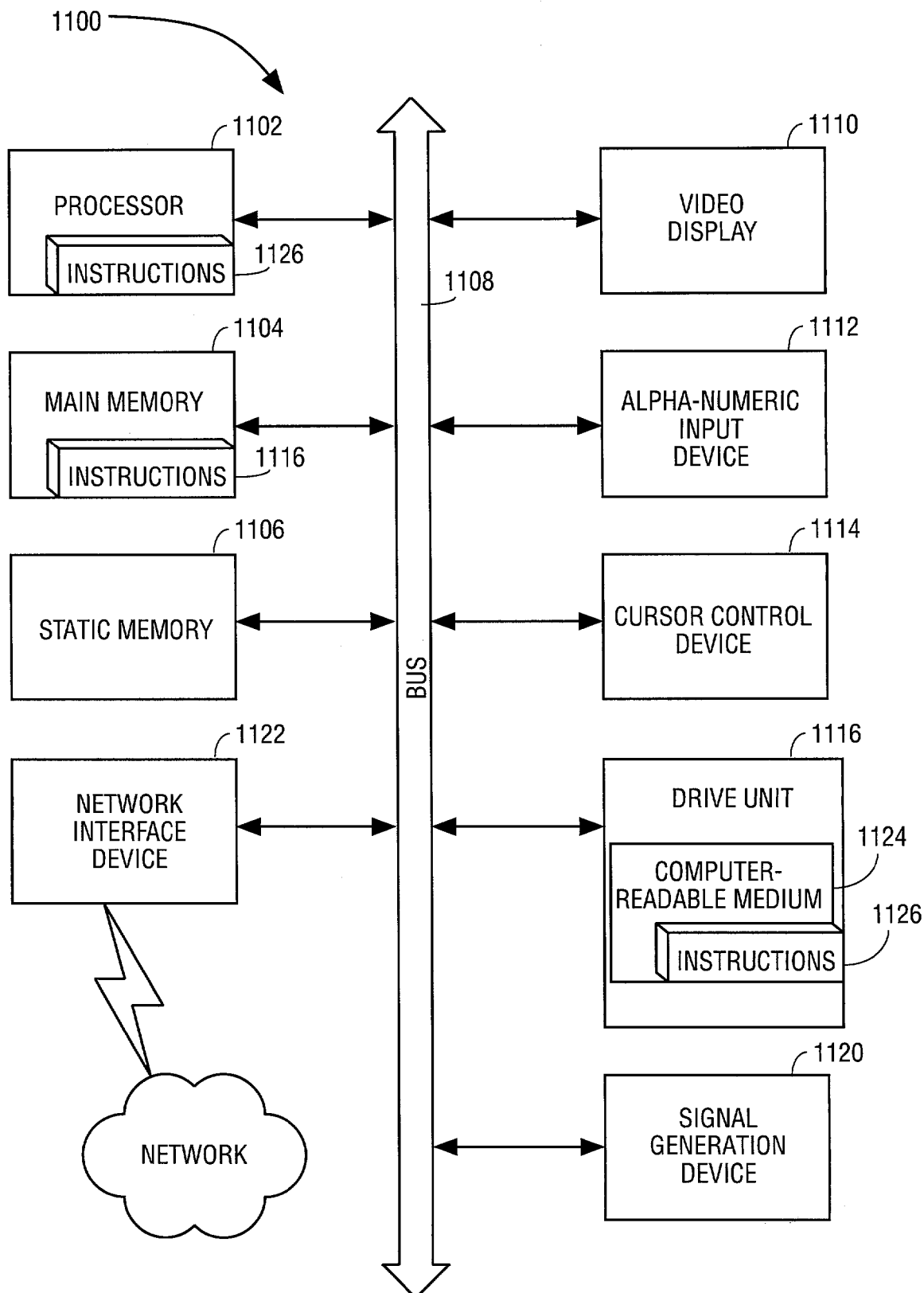
FIG. 11 shows a diagrammatic representation of a machine in the exemplary form of a computer system within which a set of instructions, for causing the machine to perform any one of the methodologies discussed herein, may be executed.

FIG. 11 shows a diagrammatic representation of machine in the exemplary form of a computer system 1100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and system for connecting and matching users of a dating service have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. In an electronic dating service, a computer implemented method comprising:
    establishing an electronic connection between a first personal computing device of a first user and a second personal computing device of a second user to allow the first and second user to have a person-to-person date via a real-time communication, for a predefined duration;
    ending said electronic connection between said first personal computing device of said first user and said second personal computing device of said second user after the predefined duration;
    after said electronic connection between said first personal computing device of said first user and said second personal computing device of said second user ends, automatically prompting the first and second users to produce a response indicating whether they felt interest in each other during the person-to-person date, each of the first and second users being prompted irrespective of an indication from the other user;
    determining a two-way match if both first and second user indicate an interest in each other; and
    if the two-way match occurs and both first and second user indicate that they would like to extend the date, re-establishing the electronic connection between said first personal computing device of said first user and said second personal computing device of said second user.

2. The method of claim 1, further comprising apprising the first and second user whether a two-way match occurs.

3. The method of claim 1, wherein establishing the electronic connection includes utilizing a telephony server to establish a telephone connection between the first personal computing device of said first user and the second personal computing device of said second user.

4. The method of claim 1, wherein establishing the electronic connection includes utilizing a telephony server to receive a telephone call from the first and second user.

5. The method of claim 1, wherein establishing the electronic connection includes utilizing a telephony server to place a telephone call to the first and second user.

6. The method of claim 1, wherein establishing the electronic connection includes utilizing a telephony server to place a telephone call to the first user and receive a telephone call from the second user.

7. The method of claim 1, wherein the electronic connection includes any one of an audio, video, or audio-video connection.

8. The method of claim 1, wherein the users have not spoken to each other previously.

9. The method of claim 1, further comprising, maintaining profile information about the first and second user.

10. The method of claim 9, further comprising providing profile information of the first and second user to each other.

11. The method of claim 9, wherein said profile information includes contact information, and further comprising providing contact information about one user to the other only if a two-way match occurs.

12. The method of claim 1, further comprising informing the first and second user of time remaining in the predefined duration.

13. The method of claim 1, further comprising prompting the first and second user to rate each other's comportment during the real-time communication.

14. The method of claim 1, further comprising prompting the first and second user to indicate if they would like to extend the date, only if a two-way match occurs.

15. The method of claim 1, further comprising maintaining an account for the first and second user.

16. The method of claim 15, wherein said account can receive credit card payment.

17. The method of claim 15, further comprising:
    monitoring the duration of the real-time communication between the users; and deducting from the account an amount corresponding to the real-time communication duration.

18. The method of claim 15, further comprising:
    monitoring the duration between establishing the real time connection and reception of the users' matching responses; and
    deducting from the account an amount based upon said duration.

19. The method of claim 15, further comprising:
    monitoring whether the user disconnects during the real time communication; and
    deducting from the user's account an amount based upon the predefined duration that the electronic connection was expected to sustain.

20. The method of claim 15, further comprising:
    determining whether the first or second user has sufficient credit in the account to meet the predefined duration that the electronic connection is expected to sustain; and
    prompting said user to credit the account, if said credit is insufficient.

21. In an electronic dating service, a computer implemented method comprising:
    presenting to a user an interface wherein the user may choose to go on a group date;
    presenting to the user a list of upcoming group-date events;
    determining if there is space available in an upcoming group-date event within the list for the user;
    determining if the user meets specified criteria for the upcoming group-date event, the specified criteria depending on a profile of the user;
    after the user selects the upcoming group-date event, automatically defining a round of dates for the user;
    when the upcoming group-date event starts, allowing the user to participate in the round of dates; and
    if a number of users who have signed up for the event within a predefined interval before the event is insufficient,
        canceling the event, and informing the signed up users electronically of the cancellation.

22. The method of claim 21 further comprising:
validating that the group-date event does not conflict with another existing group-date event or with an invited date.

23. The method of claim 22, further comprising:
performing a validation to ensure that there are sufficient credits in the user's account for at least one group-date event, based on the estimated time for a complete group-date event; and
reserving credits for the group-date event, if there are sufficient credits in the account; and
prompting the user to credit the account if there are insufficient credits in the account.

24. The method of claim 21, further comprising
pairing compatible users in the group-date event who have not previously had a date; and
allowing the paired users to have an electronic date.

25. The method of claim 24, wherein an electronic date comprises:
establishing an electronic connection between the paired compatible users to allow the paired compatible users to have a real-time communication, for a predefined duration;
ending said electronic connection between said paired compatible users after the predefined duration;
prompting the paired compatible users to indicate whether they had interest in each other; and
determining a two-way match if both the paired compatible users indicate an interest in each other.

26. A system for an electronic dating service comprising:
a plurality of personal computing devices, utilized by a plurality of users, connected to each other via a network; and
a controller to
(a) establish an electronic connection between the plurality of personal computing devices to allow the plurality of users to have a person-to-person date via a real-time communication,
(b) disconnect the plurality of personal computing devices after a predefined duration of time,
(c) after-the electronic connection between the plurality of personal computing devices ends, automatically prompt the plurality of users to produce a negative or affirmative response whether they felt an attraction for each other during the person-to-person date, each of the plurality of users being prompted irrespective of an indication from the other user, and
(d) determine a two-way match if the plurality of users indicate affirmative responses.

27. The system of claim 26, wherein the controller is to:
display to a first user of the plurality of users a list of other users, said other users previously matched with said first user;
allow the first user to select a second user from the list;
inform the second user of the first user's identity; and
prompt the second user to accept or reject a date from the first user.

28. The system of claim 27, wherein the controller is to establish an electronic connection between the first and second users if the second user accepts the date.

29. An article of manufacture comprising a machine-readable storage medium storing instructions which, when executed by a processing system, cause the processing system to perform a method, the method comprising:
establishing an electronic connection between a first personal computing device of a first user and second personal computing device of a second user to allow the first and second user to have a person-to-person date via a real-time communication, for a predefined duration;
ending said electronic connection between said first personal computing device of said first user and said second personal computing device of said second user after the predefined duration;
after said electronic connection between said first and second users ends, automatically prompting the first and second users to produce a response indicating whether they felt interest in each other during the person-to-person date, each of the first and second users being prompted irrespective of an indication from the other user;
determining a two-way match if both first and second user indicate an interest in each other; and
if the two-way match occurs and both first and second user indicate that they would like to extend the date, re-establishing the electronic connection between said first personal computing device of said first user and said second personal computing device of said second user.

* * * * *